Patented Nov. 16, 1937

2,099,623

UNITED STATES PATENT OFFICE 2,099,623

CUPRIFEROUS FUNGICIDES

Ray Riley, Long Island City, N. Y., and William McAfee Bruce, Mount Holly, N. J., assignors to The Permutit Company, New York, N. Y., a corporation of Delaware No Drawing. Application November 19, 1935, Serial No. 50,590

12 Claims. (Cl. 167—16)

This invention relates to cupriferous fungicides; and it comprises the manufacture of a dry pulveriform fungicidal preparation available for spraying or dusting, by a process which comprises forming an aqueous alumino-silicate gel by reaction of aqueous solutions containing sodium silicate and soluble alumina, placing the gel in reaction with copper in such proportion as to produce a new composite gel containing copper oxid in high molecular ratio to alumina and having a substantially neutral reaction, aging the composite gel and converting it into a dry powder; and it further comprises as a new manufacture a highly fungicidal preparation of zeolitic nature, the preparation having a high available copper content, greater than that corresponding to exchangeable base in an ordinary zeolite, and consisting of a pulverized aluminosilicate gel containing CuO, $Al_2O_3$, $SiO_2$ and water of hydration with the CuO in a molecular ratio to the $Al_2O_3$ greater than 1:1 usually being at least 3:1, and a small amount, less than 3 per cent, of exchangeable soda, the preparation incidentally having marked water softening properties; all as more fully hereinafter set forth and as claimed.

In the manufacture of zeolites for water softening purposes by the "wet method", a solution of sodium silicate is mixed with one of sodium aluminate. Reaction takes place with formation of a gel and free alkali; the solidus consisting of a hydrated compound of silica and alumina with some $Na_2O$, while the liquidus is largely a solution of NaOH. Similar aqueous gels can also be made with sodium silicate and aluminum sulfate, this salt being known as a kind of alum, the liquidus in this case containing sodium sulfate in addition to alkali. In either case the solid matter may be regarded as a hydrated aluminosilicate of sodium carrying exchangeable sodium. The proportion of silica varies according to the reagents mixed but the molecular ratio of $Al_2O_3$ to $Na_2O$ is ordinarily 1:1. The proportion of silica ranges from 3 molecules for each molecule of alumina to perhaps 15 with production of efficient base exchange material. Good preparations are made with $Al_2O_3$:$Na_2O$:$SiO_2$ ratio of 1:1:6.

Zeolites of this type, after being dried in usual ways, have physical properties which render them available as a base for the manufacture of fungicidal dusts and sprays; and particularly preparations containing copper. If a dried zeolite gel containing exchangeable sodium is treated with copper sulfate solution, copper is exchanged for sodium and the dried preparation is a fair fungicide. Used as a dust it adheres well to the leaves of plants and the contained copper does not injure the leaf. The amount of copper which can be incorporated in this way, however, is rather small, the maximum being between 5 and 10 per cent (calculated as Cu); an amount too small for a practical fungicide. Copper silicates can be prepared which have a larger proportion of copper but the copper is in a condition where it is, apparently, not fixedly held in stable combination; the preparations on standing losing fungicidal value. Other compositions high in copper and of a more stable nature can be made but it is difficult to produce compositions which are reliable; which will not at times attack or injure fruit or foliage. They are apt to be what is sometimes called "phytocidal". But we have found it possible to make cupriferous aluminosilicates combining the advantages of high copper content and high fungicidal activity, with great stability and with practically no tendency to form substances that attack fruit or foliage.

Aluminosilicates are compounds entirely different from silicates and they hold copper in such a way that it is not detrimental to a plant. But, as stated, preparations made by the direct introduction of copper into a pre-made zeolite, are too low in copper.

We have found that if copper sulfate be present in the mixture used for making the gel, copper apparently enters the molecule; becomes incorporated in the gel structure, a product can be made containing considerably more copper than corresponds to the exchangeable sodium. Nor is all the sodium replaced. The final preparation contains a small amount of $Na_2O$; substantially less than that corresponding to the 1:1 ratio of the usual zeolite.

The exact nature of the chemical compounds formed is not clear, nor is it certain in what state the copper oxid exists. The product is a bright blue granular material which when used with hard water will exercise a softening function. Afterwards, the material can be regenerated with a sodium chlorid solution in the usual way, no copper going into solution. Exchangeable sodium in some amount exists in all these preparations. In fact, preparations made according to the present invention often show an operating exchange value (determined by usual methods) of several thousand grains hardness (as $CaCO_3$) per cubic foot; values comparable to those in materials prepared especially for water-softening purposes.

It is perhaps possible that CuO goes into what would otherwise be a zeolite or alumino silicate molecule, creating a new type of molecule, or it is perhaps possible that CuO exists in a hydrated stabilized form and in molecular relation to the other substances in the zeolite. This is, of course, speculation; the actual fact is that the new preparation contains a large amount of CuO as a constituent in a form where it is active as a fungicide.

In making the new preparation solutions of sodium aluminate and sodium silicate are mixed in the usual way for preparing water softeners but there is also added copper sulfate. Sometimes alum (aluminum sulfate) is used as the source of alumina in lieu of sodium aluminate. It is desirable that the total alkali in the system be enough to form a substantially neutral solution, at the expense of the copper sulfate, plus a little more to furnish exchangeable soda to the zeolite. With some mixes additional alkali is added to obtain this neutral result. The amount of copper sulfate used varies but in all cases the ratio of copper to alumina is more than 1:1, usually substantially more than this standard ratio of exchangeable base in a zeolite. In some cases the copper sulfate is added in two or more portions, at different stages of the process. In an ordinary routine of manufacture, solutions of the three reacting bodies are mixed, the resultant gel pressed to remove mother liquor as far as possible, washed to a moderate extent and dried. It is advantageous to dry the press cake before washing, or before complete washing, and then moisten to cause a self-comminuting action or decrepitation to take place, producing a granulation. The granules at this stage are hard and stable and are thoroughly washed to remove soluble impurities (sulfates) this washing not removing desirable constituents from the dried gel. The granules, after washing, are again dried and reduced to a powder of the size desired for the fungicide.

Fungicides prepared in this manner can be made with 25 per cent or more of copper (calculated as Cu) as compared with perhaps 10 per cent in products made by straight replacement of soda by copper oxid. A preparation having 25 per cent copper has the same copper content as commercial copper sulfate and is acceptable in the trade as a high grade material. Good preparations have been made having a copper:alumina ratio as high as ten mols CuO to one $Al_2O_3$. In these high copper zeolites the amount of exchangeable soda is substantial but small. With a dry gel containing 25 per cent copper the amount of $Na_2O$ is 2.5 to 2.7 per cent; of which about two-thirds is exchangeable. This may be further diminished by a treatment with copper sulfate solution—the $Na_2O$ being lessened to 0.9 per cent—and a preparation made containing a little more copper. But the gain in copper content is not large.

In the following examples, there are given several specific embodiments of the invention. In several of the examples similar batches of reagents are used. The batches which are similar in several of the examples are listed below, and hereinafter will be referred to by letter.

Batch A.—A 4° Bé. water-glass solution made by dissolving 621 pounds of a commercial grade of 40° Bé. sirupy water-glass in water enough to give 680 gallons. This batch contained the equivalent of 180 pounds $SiO_2$ and 71.4 pounds NaOH.

Batch B.—125 pounds commercial copper sulfate, $CuSO_4.5H_2O$, dissolved in 360 gallons of water.

Batch C.—250 pounds commercial copper sulfate dissolved in 720 gallons of water.

Batch D.—92 pounds commercial grade sodium aluminate dissolved in 240 gallons water. This was a 5.6° Bé. solution containing the equivalent of 51 pounds alumina and 47.5 pounds NaOH.

Batch E.—80 pounds NaOH dissolved in 360 gallons water to give a 4.1° Bé. solution.

Batch F.—140 pounds commercial grade alum (aluminum sulfate) $Al_2(SO_4)_3.18H_2O$, dissolved in 480 gallons water to give a 2.6° Bé. solution containing the equivalent of 24.5 pounds $Al_2O_3$ and 52.4 pounds $SO_3$.

Batch G.—180 pounds NaOH dissolved in 480 gallons water to give a 5° Bé. solution.

Batch H.—625 pounds copper sulfate dissolved in 1800 gallons water. This was a 3.8° Bé. solution containing the equivalent of 200 pounds CuO and 200 pounds $SO_3$.

*Example I*

A large reaction tank was provided, having a power driven agitator. Batch A was introduced; the time for this operation being three minutes. Batch B was then introduced and immediately followed by batch D. The admixing required two minutes. Then batch C was stirred into the alkaline gelatinous mixture formed from the first three solutions. Stirring was continued for a total time of 20 minutes, thereby effecting thorough and uniform incorporation of the copper sulfate into and reaction with the gel mixture and producing a smooth paste of uniform chemical composition. Stirring was stopped and the mix was allowed to age for two hours.

At the end of this time the agitator was started and 2000 gallons of wash water were stirred into the gel during 15 minutes. The agitator was stopped and the gel allowed to settle or age for 12 hours, whereupon the supernatant liquor was siphoned off.

The gel was then pumped into a plate-and-frame filter press and pressed, the press-cake was dumped, loaded on trays to a depth of 1.5–2 inches and placed in a tunnel dryer heated with steam coils. Air was circulated through the drier and around the trays by means of a fan. The drying temperature in the cake was kept below 212° F. and drying was continued until the moisture content was about 10 per cent as determined by drying to constant weight at 105° C.; the time for drying this cake being about 24 hours.

The dried press-cake was dumped into water and decrepitated into small particles of about 10–40 mesh grain size. For washing the decrepitated material was placed in a wash tank containing a gravel bed as a false bottom and having a suitable conduit means for distributing wash water in the bottom portion of the tank. The decrepitated granular zeolite was slowly washed in downflow until practically all sulfates were leached from the product.

Giving the material a thorough washing at this stage rather than at a prior stage is advantageous in that the washing can be carried out thoroughly so as to remove most of the sulfates, while the gel product is not affected; the copper content is not diminished. The gel after drying and decrepitating is a stable, hard material which is not harmed by prolonged washing. The stability of the gel, at this stage and after final drying, is one of its advantages. It does not disintegrate, physically or chemically, under the influence of moisture.

The washed granular product was then dried in the same manner as was employed in drying the press-cake in the previous operation. The dried material from this operation was pulverized so that 98 per cent of the product passed through the openings in a 300 mesh screen. This powdered product was suitable for use directly as a dusting powder to be applied by power means or for use in forming liquid spray mixtures; the latter use being the more common.

The copper zeolite obtained contained about 23 per cent copper (as CuO) and could be represented by the following formula:

$$3CuO.Al_2O_3.6SiO_2.(Na_2O,H_2O)_n$$

The quantities of the acid-reacting and the alkaline-reacting chemicals used in this example gave an essentially neutral reaction mixture not alkaline to phenolphthalein but alkaline to methyl orange. If desired, the gel, either before or after the pressing step, can be subjected to freezing, thawing and draining to remove some of the water and give a material which can be more readily dried and crushed.

In the following examples the treatment of the gels which may be either washed or unwashed gels, to secure a final dry pulverulent product, is substantially the same as in the present example.

*Example II*

Batches A, B, C and D were employed. Batch A was placed in the same reaction tank used in the previous example, the agitator was started and batch B introduced in three minutes. Batch D was introduced and incorporated, the operation requiring two minutes. Batch C was stirred into the resulting alkaline gelatinous mixture. Stirring was continued for 20 minutes to secure a uniform paste. Agitation was stopped and the gel allowed to age. The aged gel was processed to convert it into a powder, as described in Example I.

The copper zeolite obtained (dried at 105° C.) gave on analysis:

|  | Per cent | Mols |
|---|---|---|
| CuO | 28.28 | 3.02 |
| Al₂O₃ | 11.92 | 1.0 |
| SiO₂ | 41.04 | 5.85 |
| H₂O plus Na₂O | 18.76 |  |

It could be represented by the following formula:

$$3CuO.Al_2O_3.6SiO_2.(Na_2O,H_2)_n$$

The reaction mixture was essentially neutral.

*Example III*

In this example, batches A to E were used and the same equipment as in Example I. Batch A was put in the tank. The agitator was started and batch B introduced in three minutes. Immediately thereafter batch D was introduced in two minutes and then batch C was stirred into the alkaline gelatinous mixture formed from the first three solutions; the time for this introduction being 10 minutes. The mixture at this stage was a substantially neutral copper zeolite gel. Batch E (caustic soda) was stirred in during 5 minutes, thereby securing a highly alkaline gel, and thereafter a second batch C (copper sulfate) was stirred in during 10 minutes. The amount of copper sulfate added at this time was sufficient to neutralize the free caustic and again secure a neutral copper zeolite gel.

The resulting gel was allowed to age for two hours.

For washing, 2000 gallons of water were stirred into the jelly during 15 minutes. The agitator was then stopped, the gel allowed to age for 12 hours and the supernatant wash water was decanted off.

The washed gel was processed to secure a dry powder as in Example I. The final product had the following analysis:

|  | Per cent | Mols |
|---|---|---|
| CuO | 39.6 | 5 |
| Al₂O₃ | 10.6 | 1 |
| SiO₂ | 34.3 | 6 |
| H₂O plus Na₂O | 15.5 |  |

The copper zeolite product obtained could be represented by the following formula:

$$5CuO.Al_2O_3.6SiO_2.(Na_2O,H_2O)_n$$

The reaction mixture was essentially neutral.

*Example IV*

This example was directed to the production of a product having an exceptionally high available copper content. Batches A, F, G and H were utilized. The same equipment as in Example I was used. Batch A was put in the tank. Batch F was introduced into the tank with agitation in three minutes. Immediately thereafter, batch G was introduced, producing an alkaline jelly. Batch H was stirred into the alkaline gelatinous mixture during 15 minutes and stirring was continued for an additional 15 minutes to secure a smooth paste. The gel was then aged for three hours.

At the end of this time the agitator was started and 3500 gallons of water were stirred into the mixture during 15 minutes. The agitator was stopped and the gel allowed to settle for 12 hours, after which the wash water was siphoned off. The pH of mother liquor pressed from a sample of the gel after washing was 7.1.

The gel was further processed exactly as described in Example I.

The analysis of the final dried product was:

| Materials | Per cent | Mols |
|---|---|---|
| Al₂O₃ | 5.69 | 1 |
| CuO | 46.49 | 10.4 |
| SiO₂ | 41.82 | 12.5 |
| H₂O plus Na₂O | 6.0 |  |
|  | 100 |  |

The copper content, while remarkably high, was stable and was in a form suitable for fungicides.

*Example V*

In this example a sodium zeolite gel was formed and this was treated with copper sulfate to produce a copper zeolite.

The following solutions were prepared.

1. 540 gallons of a 2.2° Bé. solution of diluted commercial water-glass containing the equivalent of 70.3 pounds SiO₂ and 27.79 pounds NaOH.

2. 76 pounds commercial sodium aluminate in 240 gallons water. This was a 4.5° Bé. solution containing the equivalent of 42.3 pounds Al₂O₃ and 39.4 pounds NaOH.

3. 123 pounds copper sulfate in 240 gallons water; a 5.4° Bé. solution containing the equivalent of 39.4 pounds CuO and 39.4 pounds SO₃.

Batch 1 was placed in the tank and batch 2 introduced during three minutes. Stirring was continued for 10 minutes. An alkaline jelly was formed by the reaction between the water-glass and the sodium aluminate solutions.

The gel was aged for two hours. The agitator was started and 780 gallons wash water were stirred into the gel. After 10 minutes agitation was stopped and the tank allowed to stand for six hours, after which supernatant wash water was siphoned off. The washing operation was repeated.

The agitator was started and batch 3 slowly stirred into the washed jelly in 15 minutes. The resulting copper zeolite jelly was allowed to age quietly for three hours. The pH of mother liquor pressed from a sample of the jelly after aging was 7.0.

The gel was further processed as described in Example I.

Quantitatively, the product may be represented as follows:

| | Per cent | Mols |
|---|---|---|
| CuO | 20 | 1.2 |
| Al₂O₃ | 21.5 | 1.0 |
| SiO₂ | 34.2 | 2.83 |
| H₂O plus Na₂O | 22.75 | |

Formula—1.2CuO.Al₂O₃.2.83SiO₂.(Na₂O,H₂O)ₙ

The washing of the gel prior to adding the copper sulfate solution may be entirely omitted. The copper zeolite jelly obtained by the direct addition of the copper sulfate solution to the highly alkaline sodium silicate—sodium aluminate mixture was alkaline and had a pH of 11.0. When the washing of the jelly is omitted it is necessary that the washing of the decrepitated granular product be thorough enough to remove all the phenolphthalein alkalinity as well as reduce the sulfate content to below 3 per cent on a dry basis.

Example VI

In this example batches A, F, G and H were utilized. Batch A was placed in the tank and batch F introduced with agitation during three minutes. Stirring was continued for 10 minutes to obtain intimate commixture. A weak gel formed.

The gel was aged for two hours. It was then washed with 2000 gallons water introduced during agitation to effect thorough mixture. The contents of the tank were allowed to settle for 12 hours and then supernatant liquors were withdrawn.

In a separate operation, batch H was mixed with batch G during three minutes in another tank and stirring was continued for 10 minutes. A precipitate of copper hydroxid formed. The mother liquid contained sodium sulfate.

The copper hydroxid precipitate was then pumped into the gel under agitation to effect complete mixing. Stirring was continued for 20 minutes whereupon agitation was stopped and the gel allowed to age for three hours. The pH of mother liquor pressed from a sample of this gel was 7.0.

The gel was further processed as in Example I. The analysis of the final dried product was:

| Materials | Per cent | Mols |
|---|---|---|
| Al₂O₃ | 5.69 | 1 |
| CuO | 46.49 | 10.4 |
| SiO₂ | 41.82 | 12.5 |
| H₂O plus Na₂O | 6.0 | |
| | 100 | |

This copper content is exceptionally high; yet the copper is in a form useful for fungicidal work and is stable.

Example VII

Batches A and F were utilized; also the following two reagent solutions:

1. A batch of 101 pounds NaOH in 280 gallons water (a 5° Bé. solution).
2. 375 pounds copper sulfate in 1000 gallons water. This was a 3.8° Bé. solution containing the equivalent of 120 pounds CuO and 120 pounds SO₃.

Batch A was placed in the tank and batch F introduced with stirring during three minutes. Immediately thereafter batch 1 was introduced. An alkaline gel formed. Batch 2 was stirred into the mixture during 15 minutes and stirring was continued for 15 minutes more to obtain a smooth paste. The mixture was allowed to age quietly for three hours.

3500 gallons of water were stirred into the copper zeolite mixture during 15 minutes. Agitation was stopped and the gel aged for 12 hours, after which wash water was removed. The pH of mother liquor pressed from the gel after washing was 7.1.

The gel was further processed as in Example I. The final dried product had the following analysis:

| Materials | Per cent | Mols |
|---|---|---|
| Al₂O₃ | 6.99 | 1 |
| CuO | 34.24 | 6.25 |
| SiO₂ | 51.37 | 12.50 |
| H₂O plus Na₂O | 7.40 | |
| | 100 | |

What we claim is:—

1. In the manufacture of fungicides containing large amounts of copper in a form available for fungicidal purposes but not injurious to vegetation, the process which comprises preparing an aqueous gel of the nature of those used in making base exchanging zeolites by mixing a solution of sodium silicate and a solution of an alumina compound of the class consisting of aluminate and alum, reacting upon said aqueous gel with copper sulfate solution prior to final drying, the amount of copper sulfate being sufficient to furnish CuO to the gelling mixture in more than an equimolecular ratio to the alumina, drying, washing and comminuting to a fine powder suitable for fungicidal purposes.

2. In the process of claim 1, introducing alumina into the gel mixture in the form of sodium aluminate.

3. In the process of claim 1 employing sodium silicate, sodium aluminate, and copper sulfates for the gel mixture in such proportions as to give a substantially neutral solution of sodium sulfate.

4. In the process of claim 1, conducting the drying in two stages, the aqueous cupriferous gel being first partially dried, decrepitated in water to granulate it, washed and then dried before grinding.

5. As a new fungicidal composition, a powdered dried zeolitic neutral aluminosilicate gel, containing copper oxid incorporated in the gel structure in a non-exchangeable form fungicidally available and in amount corresponding to a molecular ratio of copper oxid to alumina between 1:1 and about 10:1.

6. A cupriferous zeolite fungicidal preparation consisting of a pulverized neutral aluminosilicate gel containing CuO, $Al_2O_3$, $SiO_2$ in substantial proportions and water of hydration with the CuO in more than an equimolecular ratio to the $Al_2O_3$ and in a non-exchangeable form, and having a content of exchangeable soda in amount less than 3 per cent.

7. A process of making a cupriferous zeolite of high available copper content for use as a fungicide which comprises forming an aqueous aluminosilicate gel from mixed solutions of a copper salt and of alkali aluminate and alkali silicate in proportions such that the molecular ratio of copper oxid in the copper salt to the alumina of the aluminate is between 1:1 and about 10:1, the alkali of the aluminate and silicate being sufficient to neutralize the acid of the copper salt, removing water from the gel, washing and drying the gel and pulverizing the dried gel.

8. The process of making a fungicide which comprises admixing in aqueous solution and in any order, sodium silicate, sodium aluminate and copper sulfate, the aluminate and silicate being in the usual proportions to form a base exchange gel zeolite and the amount of copper sulfate being at least sufficient to give a molecular ratio of CuO to $Al_2O_3$ of 1:1 to 10:1 and the total alkali of the system being sufficient to form sodium sulfate from the copper sulfate, removing the liquid containing sodium sulfate and washing, drying and pulverizing the gel, thereby obtaining a gel zeolite high in copper in non-exchangeable form and containing exchangeable $Na_2O$ in proportion not greater than 3 per cent of the dry weight.

9. As a new fungicide composition, of an aluminosilicate gel containing exchangeable sodium and having water softening properties, said gel containing copper incorporated therein in a form not exchangeable with a sodium chlorid solution and in amount between 10 and 25 per cent, calculated as Cu, said preparation being actively fungicidal but not phytocidal.

10. In the manufacture of fungicides containing large amounts of copper in a form actively available for fundicidal purposes but not injurious to vegetation, the process which comprises preparing a substantially neutral cupriferous aqueous gel from admixed solutions of sodium silicate, an alumina compound chosen from the class consisting of aluminate and alum and copper sulfate, admixing caustic alkali with the gel to alkalize it, and adding more copper sulfate in quantity sufficient to produce a substantially neutral copper zeolite gel, of exceptionally high stable copper content.

11. In the manufacture of fungicides containing large amounts of copper in a form available for fungicidal purposes but not injurious to vegetation, the process which comprises preparing an aqueous gel of the nature of those used in making base exchange zeolites by mixing a solution of sodium silicate and one of an alumina compound chosen from the class of alkali aluminate and alum, reacting upon said gel with copper sulfate in solution prior to drying of the aqueous gel, thereby securing a copper zeolite aqueous gel containing some sulfate, drying the gel and washing the dried gel sufficiently to remove most of the sulfates from the gel while not diminishing the copper content thereof.

12. As a new fungicide composition, an alumino-silicate gel preparation having base exchange properties and containing exchangeable copper, said gel also containing copper in a form not exchangeable with a sodium chlorid solution and in amount between 10 and 25 per cent, calculated as Cu, said preparation being actively fungicidal.

RAY RILEY.
WILLIAM McAFEE BRUCE.

---

CERTIFICATE OF CORRECTION.

Patent No. 2,099,623.            November 16, 1937.

RAY RILEY, ET AL.

It is hereby certified that error appears in the printed specification of the above numbered patent requiring correction as follows: Page 3, first column, line 53, in the formula, for "SiO" read $SiO_2$; line 54, for "$H_2O_2$" read $H_2O$; line 57, for "$(Na_2O,H_2)_n$" read $(Na_2O,H_2O)_n$; and that the said Letters Patent should be read with these corrections therein that the same may conform to the record of the case in the Patent Office.

Signed and sealed this 18th day of January, A. D. 1938.

(Seal)

Henry Van Arsdale,
Acting Commissioner of Patents.

being first partially dried, decrepitated in water to granulate it, washed and then dried before grinding.

5. As a new fungicidal composition, a powdered dried zeolitic neutral aluminosilicate gel, containing copper oxid incorporated in the gel structure in a non-exchangeable form fungicidally available and in amount corresponding to a molecular ratio of copper oxid to alumina between 1:1 and about 10:1.

6. A cupriferous zeolite fungicidal preparation consisting of a pulverized neutral aluminosilicate gel containing CuO, $Al_2O_3$, $SiO_2$ in substantial proportions and water of hydration with the CuO in more than an equimolecular ratio to the $Al_2O_3$ and in a non-exchangeable form, and having a content of exchangeable soda in amount less than 3 per cent.

7. A process of making a cupriferous zeolite of high available copper content for use as a fungicide which comprises forming an aqueous aluminosilicate gel from mixed solutions of a copper salt and of alkali aluminate and alkali silicate in proportions such that the molecular ratio of copper oxid in the copper salt to the alumina of the aluminate is between 1:1 and about 10:1, the alkali of the aluminate and silicate being sufficient to neutralize the acid of the copper salt, removing water from the gel, washing and drying the gel and pulverizing the dried gel.

8. The process of making a fungicide which comprises admixing in aqueous solution and in any order, sodium silicate, sodium aluminate and copper sulfate, the aluminate and silicate being in the usual proportions to form a base exchange gel zeolite and the amount of copper sulfate being at least sufficient to give a molecular ratio of CuO to $Al_2O_3$ of 1:1 to 10:1 and the total alkali of the system being sufficient to form sodium sulfate from the copper sulfate, removing the liquid containing sodium sulfate and washing, drying and pulverizing the gel, thereby obtaining a gel zeolite high in copper in non-exchangeable form and containing exchangeable $Na_2O$ in proportion not greater than 3 per cent of the dry weight.

9. As a new fungicide composition, of an aluminosilicate gel containing exchangeable sodium and having water softening properties, said gel containing copper incorporated therein in a form not exchangeable with a sodium chlorid solution and in amount between 10 and 25 per cent, calculated as Cu, said preparation being actively fungicidal but not phytocidal.

10. In the manufacture of fungicides containing large amounts of copper in a form actively available for fundicidal purposes but not injurious to vegetation, the process which comprises preparing a substantially neutral cupriferous aqueous gel from admixed solutions of sodium silicate, an alumina compound chosen from the class consisting of aluminate and alum and copper sulfate, admixing caustic alkali with the gel to alkalize it, and adding more copper sulfate in quantity sufficient to produce a substantially neutral copper zeolite gel, of exceptionally high stable copper content.

11. In the manufacture of fungicides containing large amounts of copper in a form available for fungicidal purposes but not injurious to vegetation, the process which comprises preparing an aqueous gel of the nature of those used in making base exchange zeolites by mixing a solution of sodium silicate and one of an alumina compound chosen from the class of alkali aluminate and alum, reacting upon said gel with copper sulfate in solution prior to drying of the aqueous gel, thereby securing a copper zeolite aqueous gel containing some sulfate, drying the gel and washing the dried gel sufficiently to remove most of the sulfates from the gel while not diminishing the copper content thereof.

12. As a new fungicide composition, an alumino-silicate gel preparation having base exchange properties and containing exchangeable copper, said gel also containing copper in a form not exchangeable with a sodium chlorid solution and in amount between 10 and 25 per cent, calculated as Cu, said preparation being actively fungicidal.

RAY RILEY.
WILLIAM McAFEE BRUCE.

---

CERTIFICATE OF CORRECTION.

Patent No. 2,099,623.                     November 16, 1937.

RAY RILEY, ET AL.

It is hereby certified that error appears in the printed specification of the above numbered patent requiring correction as follows: Page 3, first column, line 53, in the formula, for "SiO" read $SiO_2$; line 54, for "$H_2O_2$" read $H_2O$; line 57, for "$(Na_2O, H_2)_n$" read $(Na_2O, H_2O)_n$; and that the said Letters Patent should be read with these corrections therein that the same may conform to the record of the case in the Patent Office.

Signed and sealed this 18th day of January, A. D. 1938.

(Seal)

Henry Van Arsdale,
Acting Commissioner of Patents.

CERTIFICATE OF CORRECTION.

Patent No. 2,099,623. November 16, 1937.

RAY RILEY, ET AL.

It is hereby certified that error appears in the printed specification of the above numbered patent requiring correction as follows: Page 3, first column, line 53, in the formula, for "SiO" read $SiO_2$; line 54, for "$H_2O_2$" read $H_2O$; line 57, for "$(Na_2O,H_2)_n$" read $(Na_2O,H_2O)_n$; and that the said Letters Patent should be read with these corrections therein that the same may conform to the record of the case in the Patent Office.

Signed and sealed this 18th day of January, A. D. ,938.

(Seal)

Henry Van Arsdale,
Acting Commissioner of Patents.